(12) United States Patent
Altamura

(10) Patent No.: US 10,578,166 B2
(45) Date of Patent: Mar. 3, 2020

(54) ACCESSORY ASSEMBLY OF A TURBINE ENGINE

(71) Applicant: GE AVIO S.r.l., Rivalta di Turin (IT)

(72) Inventor: Paolo Altamura, Monopoli (IT)

(73) Assignee: GE AVIO S.R.L., Rivalta di Torino (IT)

( * ) Notice: Subject to any disclaimer, the term of this patent is extended or adjusted under 35 U.S.C. 154(b) by 355 days.

(21) Appl. No.: 15/521,067

(22) PCT Filed: Oct. 22, 2015

(86) PCT No.: PCT/IB2015/058163
§ 371 (c)(1),
(2) Date: Apr. 21, 2017

(87) PCT Pub. No.: WO2016/063248
PCT Pub. Date: Apr. 28, 2016

(65) Prior Publication Data
US 2017/0335896 A1    Nov. 23, 2017

(30) Foreign Application Priority Data
Oct. 22, 2014   (IT) .............. TO2014A0856

(51) Int. Cl.
*F16D 9/08*      (2006.01)
*F02C 7/06*      (2006.01)
(Continued)

(52) U.S. Cl.
CPC .............. *F16D 9/08* (2013.01); *F01D 25/16* (2013.01); *F02C 7/06* (2013.01); *F02C 7/32* (2013.01);
(Continued)

(58) Field of Classification Search
CPC ... F05D 2260/53; F05D 2260/531; F16D 9/08
See application file for complete search history.

(56) References Cited

U.S. PATENT DOCUMENTS 3,126,723 A * 3/1964 Dugay ............... F16D 9/08
                                                    464/33
3,377,798 A    4/1968 Williams
(Continued)

FOREIGN PATENT DOCUMENTS

| CN | 101235753 A | 8/2008 |
| EP | 1898072 A1 | 3/2008 |
| FR | 1521603 A | 4/1968 |

OTHER PUBLICATIONS

First Office Action and Search issued in connection with corresponding CN Application No. 201580056332.4 dated Mar. 27, 2018 (English Translation not Available).
(Continued)

*Primary Examiner* — Igor Kershteyn
*Assistant Examiner* — Jason G Davis
(74) *Attorney, Agent, or Firm* — McGarry Bair PC

(57) ABSTRACT

An accessory assembly of a turbine engine has a support structure and a shaft coupled to the support structure by means of a pair of main bearings and provided with an end portion, which has a shear neck designed to break when the torque transmitted to that shaft exceeds a predetermined design threshold; the accessory assembly also has a gear, which defines a motion inlet, is fixed to the end portion and, when said shear neck breaks, remains supported by a single secondary bearing; the latter is distinct from said main bearings and is arranged axially between said shear neck and the gear.

9 Claims, 2 Drawing Sheets

(51) Int. Cl.
    *F02C 7/32*         (2006.01)
    *F01D 25/16*      (2006.01)
    *F01D 21/00*      (2006.01)

(52) U.S. Cl.
    CPC .......... *F01D 21/00* (2013.01); *F05D 2220/30* (2013.01); *F05D 2240/50* (2013.01); *F05D 2260/311* (2013.01); *F05D 2260/4031* (2013.01)

(56) References Cited

U.S. PATENT DOCUMENTS 4,622,818 A * 11/1986 Flaxington .............. F01D 25/04
                                                            415/124.2
2008/0238098 A1    10/2008   Becquerelle

OTHER PUBLICATIONS

International Search Report dated Feb. 10, 2016 for PCT application No. PCT/IB2015/058163.
Written Opinion dated Feb. 10, 2016 for PCT application No. PCT/IB2015/058163.

\* cited by examiner

ACCESSORY ASSEMBLY OF A TURBINE ENGINE

TECHNICAL FIELD

The present invention relates to an accessory assembly of a turbine engine.

BACKGROUND ART

As a rule, to operate an accessory assembly of a turbine engine it is known to use a gear, defining the motion inlet, and a transmission shaft that connects this gear in an angularly fixed manner with an internal shaft of the accessory assembly.

The transmission shaft, generally referred to as a "quill shaft", has a protective function. According to this function, the shaft has a weakened area, referred to as a "shear neck", for example defined by a narrower cross-section and designed so as to break when the transmitted torque exceeds a predetermined threshold. The above-mentioned gear is coupled to a fixed structure in an independent manner from the shaft of the accessory assembly, by means of two bearings, which are arranged on axially opposite sides of the gear. These bearings support the gear, together with a part of the transmission shaft, when the above-described shear neck breaks.

The solution of the type just described is not very satisfactory, as it does not allow creating particularly compact and light configurations.

DISCLOSURE OF INVENTION

The object of the present invention is to provide an accessory assembly of a turbine engine that enables overcoming the above-described problems in a simple and inexpensive manner.

According to the present invention, an accessory assembly of a turbine engine is provided as defined in claim 1.

BRIEF DESCRIPTION OF THE DRAWINGS

The invention shall now be described with reference to the accompanying drawings, which illustrate a non-limitative embodiment, in which.

BEST MODE FOR CARRYING OUT THE INVENTION

Figure 1:
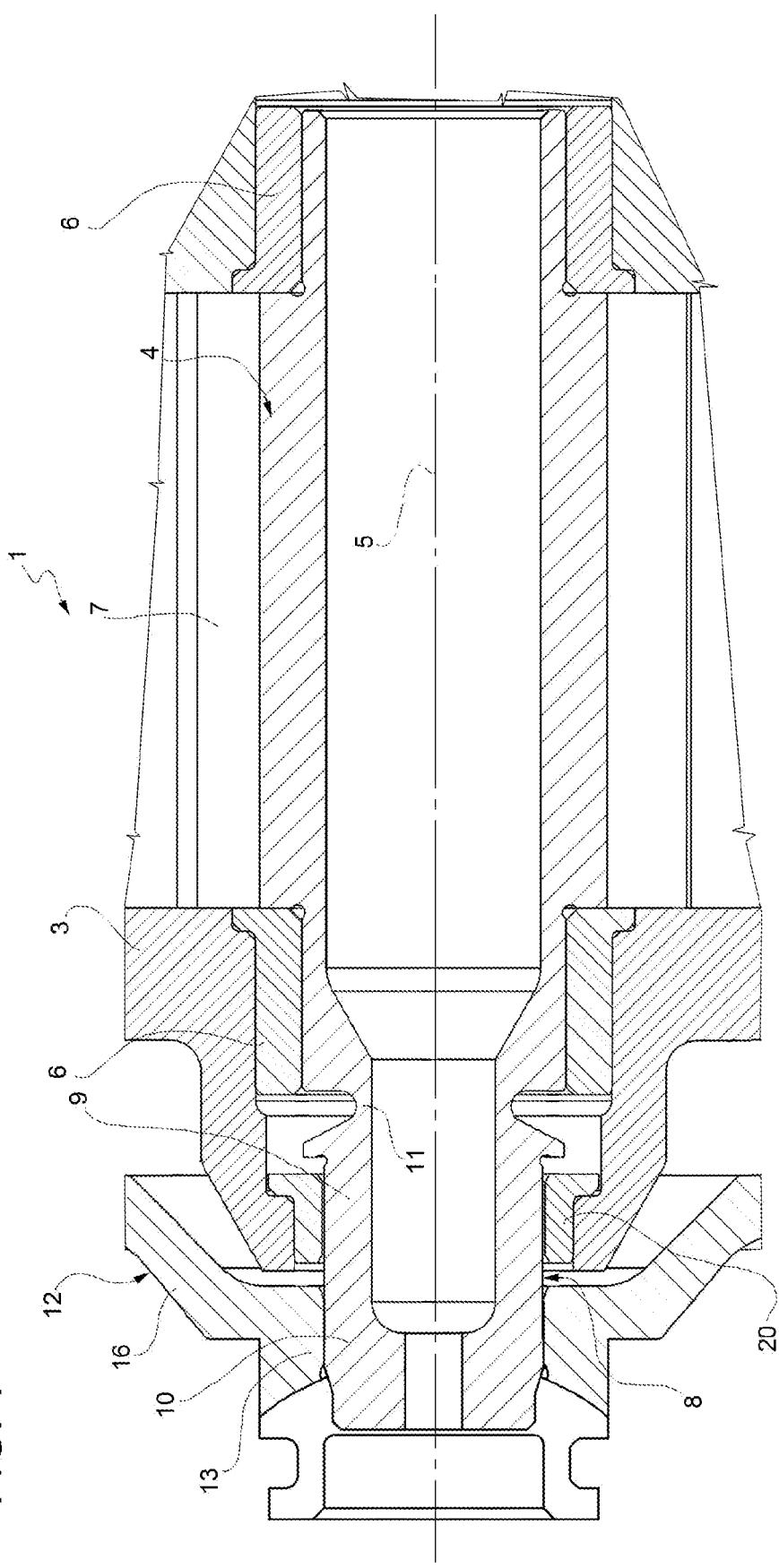
FIG. 1 is a section, along a meridian section plane and with parts removed for clarity, which shows a preferred embodiment of the accessory assembly of a turbine engine, according to the present invention.

Referring to FIG. 1, reference numeral 1 indicates, as a whole, an accessory assembly of a turbine engine (partially shown).

The accessory assembly 1 comprises a support structure 3 and a transmission shaft 4 (partially shown), which extends along an axis 5 and is coupled to the structure 3 in an angular rotational manner and axially secured by two main bearings 6. The bearings 6 are set axially apart, so as to be arranged on opposite sides of a gear 7, which is fixed with respect to the shaft 4. In this specific case, the bearings 6 are friction bearings, as they perform a lubricant sealing function in addition to the support function for the shaft 4. In any case, the bearings 6 could be of the rolling type.

Preferably, the shaft 4 is defined by a one-piece body, while the gear 7 is a separate part carried on the shaft 4. Alternatively, the shaft 4 could be composed of several parts fixed to each other and/or the gear 7 could be made in one piece with the shaft 4.

The shaft 4 comprises an end portion 8, which extends from the bearing 6 towards the outside of the structure 3. In particular, portion 8 comprises a section 9, housed in the structure 3, and an end section 10, external to the structure 3.

Section 9 comprises a so-called "shear neck", indicated by reference numeral 11, defined by narrower cross-section with respect to the remaining part of portion 8 and designed so as to define a point in which the shaft 4 breaks when the torque transmitted by the shaft 4 exceeds a design-defined threshold. Preferably, the shear neck 11 is arranged in an axial position that is immediately next to the coupling surface provided for the bearing 6.

Referring to FIG. 1, the accessory assembly 1 further comprises a gear 12, which is placed outside the structure 3 and defines a motion inlet member, as it receives rotatory motion from a transmission gearbox, which is not shown.

Figure 2:
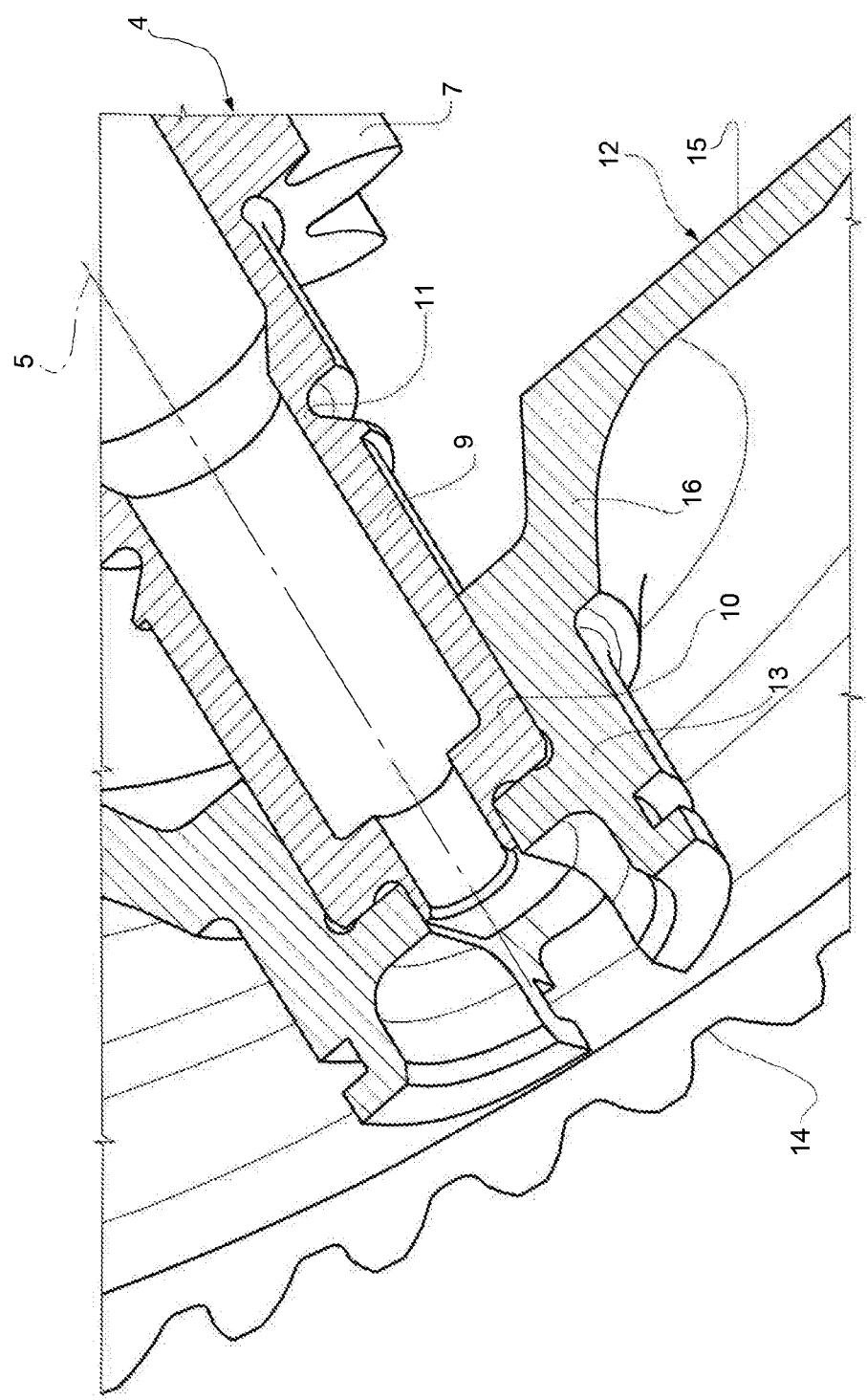
FIG. 2 is a partial perspective cutaway view of a detail in FIG. 1.

As can be seen in FIG. 2, the gear 12 comprises: a hub 13 coupled in a fixed position to the end section 10 in a manner not shown in detail; a disc 15, which lies on a radial plane with respect to axis 5 and axially faces the structure 3; a toothing 14 arranged along the outer circumference of the disc 15; and a truncated cone shaped portion 16, which joins the disc 15 to the hub 13.

Referring to FIG. 1, according to one aspect of the present invention, the gear 12 and the end section 10 are still coupled to the structure 3 by means of a bearing 20 when the shear neck 11 breaks. Bearing 20 is arranged axially between the shear neck 11 and the hub 13 and is advantageously chosen so as to have a support capability both in the radial direction and in the axial direction.

Preferably, the axial position of bearing 20 is aligned in a radial direction with the toothing 14 and the disc 15. This configuration enables eliminating the development of tilting moments.

Preferably, bearing 20 is fitted on section 9 and is suitable for directly coupling section 9 to the structure 3. Under normal operating conditions (i.e. when the shear neck 11 is intact), relatively broad radial play is provided between bearing 20 and section 9 or between bearing 20 and the structure 3, so as to avoid contact and, therefore, a hyperstatic condition. Friction between the surfaces in relative motion is always avoided under these conditions.

In other words, under normal operating conditions, portion 8 is cantilever supported by bearing 6. Torque is transmitted from the shaft 4 and through the shear neck 11 to the accessories to be driven. When the torque on the shaft 4 exceeds the transmissible threshold limit set by design, it breaks at the shear neck 11 and the gear 12 thus becomes detached from the remaining part of the shaft 4. In this situation, bearing 20 intervenes and supports portion 8, such that the gear 12 remains correctly supported in rotation and does not cause breakage of the transmission gearbox arranged upstream.

Preferably, bearing 20 is a friction bearing, which can be shaped and worked to obtain the required couplings.

Alternatively, bearing 20 is a rolling bearing, with which correct coupling can be achieved by providing radial play between the outer ring of the bearing and its seat in the structure 3.

From the foregoing, it is evident that the particular solution claimed has a relatively low number of components and is extremely compact in the axial direction, as the gear 12 remains supported only at bearing 20 when the shear neck 11 breaks.

Furthermore, when the shear neck 11 breaks, the gear 12 remain constrained to the structure 3, without having to provide other additional support structures and/or additional transmission shafts.

In addition, the shape of portion 16 contributes to radially align the toothing 14 with bearing 20 and therefore to avoid tilting moments on bearing 20 when the shear neck 11 breaks.

Finally, it is evident that due to its simplicity, the solution described and illustrate herein can be mounted in a relatively easy and rapid manner.

From the foregoing, it is evident that modifications and variants can be made regarding the accessory assembly 1 without departing from the scope as the defined by the appended claims.

Furthermore, as mentioned above, the end portion 8 could be defined by an element coupled to the remaining part of the shaft 4, for example by means of a spline coupling; and/or the gear 12 could be shaped differently from that shown by way of example.

The invention claimed is:

1. An accessory assembly of a turbine engine, comprising:
   a support structure;
   a transmission shaft coupled to said support structure by a pair of main bearings and comprising an end portion, which axially protrudes with respect to one of said main bearings and comprises a shear neck designed to break when a torque transmitted to the transmission shaft exceeds a predetermined design threshold;
   a gear including toothing arranged outside said support structure, defining, in use, a motion inlet and coupled in a fixed position to said end portion;
   wherein when said shear neck breaks, said gear remains coupled to said support structure by means of a single secondary bearing, which is distinct from said main bearings and is arranged axially between said shear neck and said gear; and
   wherein the axial position of the secondary bearing is radially aligned with the toothing of the gear.

2. The accessory assembly according to claim 1, wherein said secondary bearing is defined by an element having a support capacity both in the radial direction and in the axial direction.

3. The accessory assembly according to claim 2, wherein said secondary bearing is a plain bearing.

4. The accessory assembly according to claim 1, wherein, under normal operating conditions, a radial clearance is provided either between said secondary bearing and said transmission shaft or between said secondary bearing and said support structure.

5. An accessory assembly of a turbine engine, comprising:
   a support structure;
   a transmission shaft coupled to the support structure by a pair of main bearings and comprising an end portion, which axially protrudes with respect to one of the main bearings and comprises a shear neck designed to break when a torque transmitted to the transmission shaft exceeds a predetermined design threshold;
   a gear including toothing arranged outside the support structure, defining, in use, a motion inlet and coupled in a fixed position to the end portion;
   a secondary bearing provided between the shear neck and the gear;
   wherein when the shear neck breaks, the gear remains coupled to the support structure by means of the secondary bearing.

6. The accessory assembly of claim 5 wherein the axial position of the secondary bearing is radially aligned with the toothing of the gear relative to the transmission shaft.

7. The accessory assembly of claim 5 wherein the secondary bearing is defined by an element having a support capacity both in a radial direction and in the axial direction relative to the transmission shaft.

8. The accessory assembly of claim 7 wherein the secondary bearing is a plain bearing.

9. The accessory assembly of claim 5 wherein, under normal operating conditions, a radial clearance is provided either between the secondary bearing and the transmission shaft or between the secondary bearing and the support structure.

* * * * *